US008671541B2

(12) United States Patent
Coenraets

(10) Patent No.: US 8,671,541 B2
(45) Date of Patent: Mar. 18, 2014

(54) METHOD FOR PRODUCING A SHUTTER AND METHOD FOR PRODUCING A SET OF TWO SERRATED BELTS

(75) Inventor: Benoit Coenraets, Brussels (BE)

(73) Assignee: Dynaco Europe NV, Moorsel-Aalst (BE)

( * ) Notice: Subject to any disclaimer, the term of this patent is extended or adjusted under 35 U.S.C. 154(b) by 833 days.

(21) Appl. No.: 12/526,219

(22) PCT Filed: Jan. 31, 2008

(86) PCT No.: PCT/EP2008/051203
§ 371 (c)(1),
(2), (4) Date: Aug. 6, 2009

(87) PCT Pub. No.: WO2008/101779
PCT Pub. Date: Aug. 28, 2008

(65) Prior Publication Data

US 2010/0005642 A1 Jan. 14, 2010

(30) Foreign Application Priority Data

Feb. 7, 2007 (EP) .................................... 07101861

(51) Int. Cl.
*B23P 11/00* (2006.01)
*E06B 9/56* (2006.01)

(52) U.S. Cl.
USPC .................. 29/428; 29/450; 29/446; 29/458; 160/273.1; 160/268.1; 160/270

(58) Field of Classification Search
USPC ......... 29/446, 450, 451, 458, 428; 160/231.1, 160/231.2, 201, 206, 268.1, 273.1, 270
See application file for complete search history.

(56) References Cited

U.S. PATENT DOCUMENTS

| | | | | | |
|---|---|---|---|---|---|
| 173,705 | A * | 2/1876 | Wilson | ......................... | 160/133 |
| 2,320,052 | A * | 5/1943 | Rodriguez | ................. | 160/231.2 |
| 4,273,238 | A * | 6/1981 | Blattermann et al. | ........ | 198/605 |
| 4,276,039 | A * | 6/1981 | Takano | ......................... | 474/205 |
| 4,565,231 | A * | 1/1986 | Moessner et al. | ............. | 160/133 |
| 6,119,758 | A * | 9/2000 | Coenraets | .................. | 160/273.1 |
| 6,868,747 | B2 * | 3/2005 | Goser et al. | ....................... | 74/25 |
| 7,028,741 | B2 * | 4/2006 | Coenraets | .................. | 160/273.1 |
| 7,275,581 | B2 * | 10/2007 | Coenraets | .................. | 160/273.1 |
| 7,841,377 | B2 * | 11/2010 | Coenraets | .................. | 160/268.1 |
| 2002/0198074 | A1 * | 12/2002 | Goser et al. | ................... | 474/237 |
| 2006/0037718 | A1 * | 2/2006 | Coenraets | ..................... | 160/133 |
| 2010/0000692 | A1 * | 1/2010 | Coenraets | .................. | 160/323.1 |
| 2010/0288452 | A1 * | 11/2010 | Coenraets | ..................... | 160/309 |

FOREIGN PATENT DOCUMENTS

| | | | | | |
|---|---|---|---|---|---|
| CN | 201826730 | U * | 5/2011 | ................ | E06B 9/08 |
| DE | 19636176 | A1 | 3/1998 | | |
| EP | 1460231 | A2 | 9/2004 | | |
| EP | 1956177 | A1 * | 8/2008 | ................ | E06B 9/13 |
| EP | 1956178 | A1 * | 8/2008 | ................ | E06B 9/13 |
| GB | 2063358 | A * | 6/1981 | .............. | E05F 16/10 |

* cited by examiner

*Primary Examiner* — Essama Omgba
(74) *Attorney, Agent, or Firm* — Browdy and Neimark, PLLC

(57) ABSTRACT

The present invention concerns a method for producing a shutter (2) designed to be rolled up and unrolled, characterized in that on each face, opposite one another, is provided a serrated belt (3,4) comprising a succession of teeth, and in that, in order to make it possible for both belts (3,4) to mesh, the position of the teeth of at least one of the belts (3,4) is adjusted by deforming said belt (3,4) in such a way that both belts (3,4) can mesh, and that this mutual position of the belts (3,4) can subsequently be stabilized.

12 Claims, 2 Drawing Sheets

METHOD FOR PRODUCING A SHUTTER AND METHOD FOR PRODUCING A SET OF TWO SERRATED BELTS

The present invention concerns a method for producing a shutter designed to be rolled up and unrolled and having a belt on either face, whereby both belts are situated opposite one another and work in conjunction in such a manner that one of both belts can drive the other one. Both belts are preferably serrated.

A major problem with this type of shutters with serrated belts is due to the fact that, while it is being rolled up, the distance between two consecutive teeth changes constantly. Indeed, this distance not only depends on the angle of curvature of the rolled-up shutter, but it also varies continuously during the winding. Moreover, for shutters and belts with varying thicknesses, one also has to reckon with said variation in those spots where the belts are fixed to the shutter. Thus, in order to make it possible for the belt situated on one of the faces to engage with the belt on the other face, the distance between two consecutive teeth of one of the belts should be adjusted to the distance between the teeth of the other belt while compensating any thickness and length tolerances.

It has been found, based on the actual knowledge of the professional, that this cannot be realised with the required precision in order to obtain a perfect meshing of two co-operating belts.

One of the main aims of the present invention is to offer a very simple and very efficient solution to this problem, which does not require any special technical know-how and which can be obtained within a very short time span.

To this end, the method according to the invention adjusts the position of the teeth of at least one of the belts, while the shutter is being rolled up simultaneously with the belts, by deforming said belt in such a way that both belts can mesh, and subsequently this position of the belts in relation to the shutter is stabilized.

According to a first special embodiment of the invention, the shutter is being rolled up while a belt which is free in relation to the shutter and which is placed opposite one of the faces of the latter is made to mesh with a belt which has been previously fixed to the opposite face of the shutter, whereby this meshing takes place during the winding of the shutter as soon as both belts make contact, whereby the free belt is subsequently fixed to the shutter on the face opposite the one of the fixed belt while the teeth of the belts engage.

According to a second special embodiment of the invention, both belts are made to mesh before they are fixed to the shutter, after which the shutter is rolled up simultaneously with both belts in such a manner that they are inserted between the successive windings of the rolled-up shutter and, as a consequence, between the opposite faces of the shutter, whereby each of the belts is then fixed to the face facing the shutter while the latter is being rolled up.

According to a third special embodiment, a belt made of plastic, in particular a thermoplastic or thermosetting material, is provided on one of the faces of the shutter, and facing this belt is provided a serrated belt on the other face of the shutter, whereby the shutter is then rolled up in such a manner that, during this winding, the teeth of the serrated belt penetrate in the plastic belt and form teeth in the latter, such that both belts are made to mesh. Next, the plastic is made to set so as to stabilize the position of the teeth in relation to the shutter.

Other details and particularities of the invention will become clear from the following description of some special embodiments, given by way of example only without being limitative in any way, with reference to the accompanying drawings.

Figure 1:
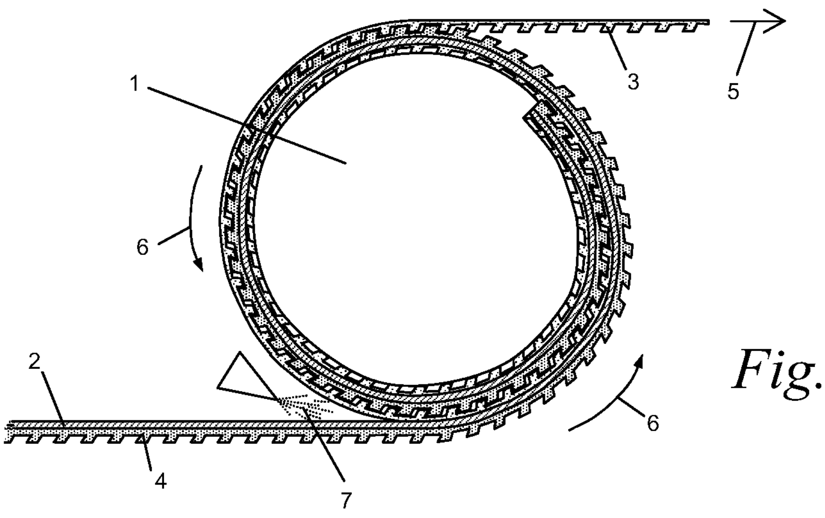
FIG. 1 is a schematic cross section of a first embodiment of the invention.
Figure 3:
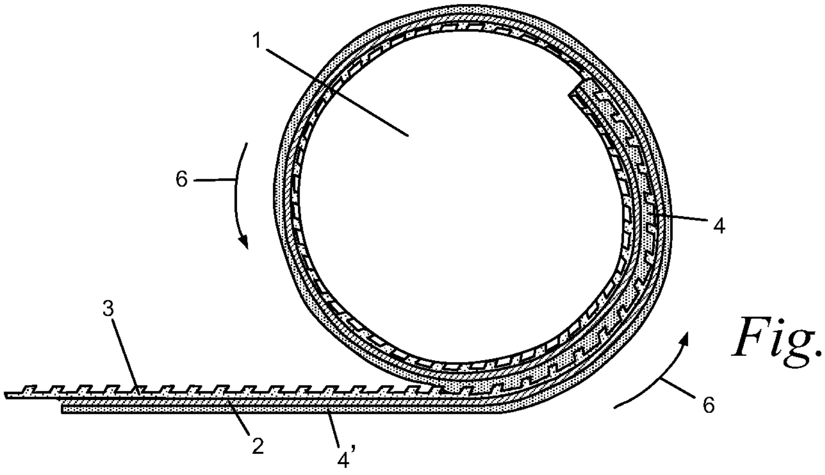

FIG. 3 also shows a section analogous to that in FIG. 1 of a third embodiment of the invention.

Figure 4:
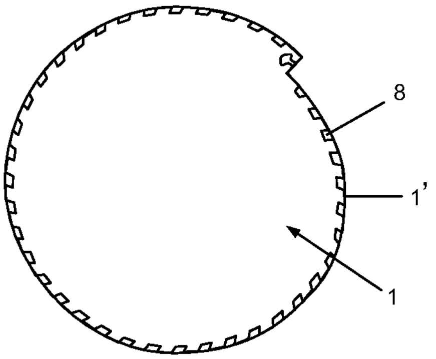

FIG. 4 is a cross section of a drum, seen transversally to its axis, according to a special embodiment of the invention.

Figure 5:
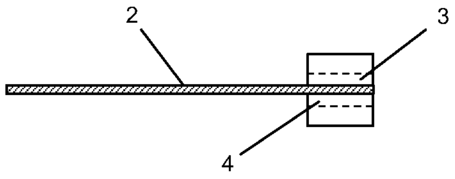

FIG. 5 is a section of the lateral edge of a shutter according to a first embodiment of the invention.

Figure 6:
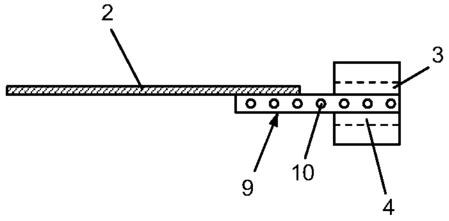

FIG. 6 shows a view analogous to that in FIG. 5 of a second embodiment of the invention.

Figure 7:
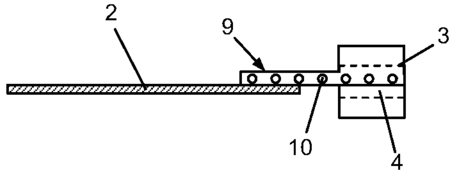

FIG. 7 also shows a view analogous to that in FIG. 5 of a third embodiment of the invention.

In the different figures, the same figures of reference refer to analogous or identical elements.

In a general manner, the present invention concerns a method for producing a shutter designed to shut a bay or any other opening whatsoever, such as a window, the loading space of a vehicle, such as a lorry, a vessel or a caisson, to cover a swimming pool, etc.

In particular, a method for producing a shutter is concerned which is designed to be rolled up and unrolled between an open position and a shut position. To this end, two serrated belts are preferably provided near the lateral edges of the shutter, facing each other so that, when the shutter is rolled up and unrolled, the two belts will mesh.

According to the invention, the position of the teeth of at least one of the belts is adjusted, while the shutter is being rolled up, by deforming said belt, preferably in the longitudinal direction, in such a way that both belts can mesh, and this position of the belts in relation to the shutter is stabilized so as to maintain said belt in its deformed position.

According to the first embodiment represented in FIG. 1, the shutter 2 is rolled up on a drum 1 while a belt 3, which is not fixed to the shutter 2 and which is provided opposite one of the faces of the latter, is made to mesh with a belt 4 fixed to the face opposite the one which is oriented towards the drum 1, whereby this meshing then takes place while the shutter 2 is being rolled up.

In order to make the teeth of the belts mesh, the free belt 3 is stretched in the longitudinal direction, as indicated by the arrow 5, in a sense opposite the winding direction of the shutter 2, indicated by the arrows 6.

This stretching takes place while the shutter 2 is being rolled up, in such a manner that the latter will extend as a function of the position of the fixed belt's 4 teeth, and such that both belts 3 and 4 can mesh when they make contact.

In this regard, it is important that at least the free belt 3 is not only flexible but can be extended somewhat as a result of the above-mentioned stretching. To this end, at least the belt 3 is made of rubber or an analogous, relatively hard but slightly extensible and preferably somewhat elastic material. Advantageously, the two belts 3 and 4 are made of the same material.

During the meshing, the free belt 3 will be fixed to the face of the shutter opposite the one with the belt 4. The belt 3 is fixed to the shutter 2 with a fluid adhesive 7 which is injected between the shutter 2 and the belt 3, just before the shutter 2 makes contact with the belt 3. This adhesive 7, which is then compressed between the shutter 2 and the belt 3, may set during the winding so as to form a solid joint.

As a variant, one could use a strip with two adhesive sides, instead of a fluid adhesive. This variant may be considered as an equivalent technique. When such a strip offers sufficient resistance it may reinforce the belt in question. This embodiment is not represented in the drawings.

In another variant, the belt 3 may be fixed to the shutter 2 by means of welding, soldering or any equivalent technique.

In the embodiment represented in FIG. 1, the pitch between two teeth of the belt 3, before this belt 3 is extended, may be somewhat larger than the pitch between the teeth of the belt 4. Thus, the traction force to be exerted on the belt 3 may be somewhat less then if the pitches of both belts 3 and 4 were identical. The difference between the pitches of the teeth of said belts 3 and 4 depends on the diameter of the windings forming the roll of the shutter 2, in particular of the curvature of the windings, and it is for example in the order of 8%.

Figure 2:
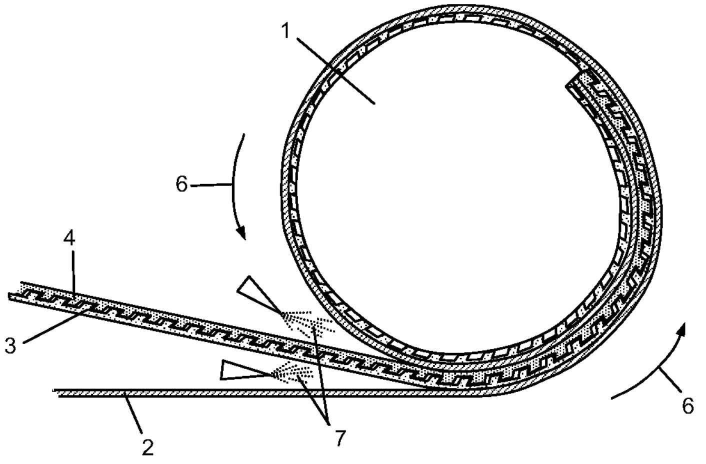
FIG. 2 is a section analogous to that in FIG. 1 of a second embodiment of the invention.

According to the second embodiment represented in FIG. 2, two belts 3 and 4 are made to mesh before they are fixed to the shutter 2. The pitch of the teeth of the belts 3 and 4, when they lay flat, is generally substantially identical.

Next, the shutter 2 is rolled up simultaneously with the two meshed belts 3, 4, such that they are inserted between the successive windings of the rolled-up shutter and, as a consequence, between the opposite faces of the latter. As a result of this winding, at least one of the belts will be deformed somewhat in its longitudinal direction.

Both belts 3 and 4 are fixed to the face facing the shutter 2 while the latter is being rolled up, in the same manner as the belt 3 of the first embodiment.

The third embodiment, as represented in FIG. 3, mainly differs from the two preceding embodiments in that a non-serrated belt 4' is initially used, formed of a simple strip made of a known thermoplastic or thermosetting material known as such, which is fixed to the face of the shutter 2 opposite the one which is directed towards the drum 1. In this embodiment, no traction whatsoever is exerted on the belt 4'.

Facing the belt 4', on the other face of the shutter 2, is provided a serrated belt 3 which may be fixed to the shutter in the same manner as in the two preceding embodiments.

While the shutter 2 is being rolled up, the teeth of the serrated belt 3 penetrate in the belt 4' made of plastic in such a way that the belt 4' is transformed into a serrated belt 4 which meshes with the belt 3.

Next, the plastic is made to set in a known manner so as to stabilize the position of the teeth of the thus engaged belts 3 and 4. To this end, the plastic may possibly contain a hardening agent which is also known as such.

FIG. 4 represents a drum 1 whose section perpendicular to its axis of rotation resembles substantially to a spiral. The wall 1' of the drum represented in FIG. 4 is provided with a succession of notches 8 at its lateral edges in which the teeth of a serrated belt 3 may penetrate. These notches 8 may for example have a shape corresponding to the one of the serrated belt 3.

FIG. 5 shows a detail of two serrated belts 3 and 4 that are fixed directly to each face of a shutter 2 while this shutter 2 is being rolled up, as is the case in the embodiments of FIGS. 1 to 3.

FIG. 6 concerns an embodiment which is different from the one represented in FIG. 5 in that the lateral edge of the shutter 2 is formed of a flexible strip 9 containing a reinforcement 10 extending in the longitudinal direction of said strip 9. In this embodiment, the serrated belts 3 and 4 are fixed to the strip 9 by gluing or by welding or any other equivalent means.

The reinforcement 10 is not always indispensable, however, e.g. if the strip itself is sufficiently resistant.

The embodiment represented in FIG. 7 is different from the one represented in FIG. 6 in that one of the serrated belts 3 forms a whole with the strip 9, i.e. is designed as a single piece with the latter.

In the two embodiments represented in FIGS. 6 and 7, the serrated belts 3 and 4 are fixed to the lateral edge of the shutter 2 formed of the strip 9.

According to a variant of the method according to the invention, the strip 9 with the belts 3 and 4, fixed to either side of the latter, is rolled up independently of the body of the shutter 2, i.e. before fixing it to the latter. By 'body of the shutter' should be understood the part of the shutter 2 without the strip 9.

The serrated belts 3 and 4 are preferably formed of an elastomer, such as polyurethane, such that they can be fixed to the shutter 2 itself or to said flexible strip 9 of the latter by means of gluing or welding.

It is clear that the present invention is not limited to the different embodiments described above and illustrated in the accompanying drawings, but that also other variants are possible while still remaining within the scope of the invention.

Thus, the shape of the teeth may strongly vary in certain cases, provided the teeth of one of the belts can penetrate into the recesses between the teeth of the other belt and can rest on the latter while the shutter is being unrolled.

Thus, in certain cases, the teeth may be formed of pens that are evenly distributed over one of the belts and of slots formed of corresponding cavities in the other belt.

Moreover, it is not absolutely necessary that there is a play between the teeth of the two meshed belts.

The invention claimed is:

1. A method for producing a shutter (2) designed to be rolled up and unrolled, comprising:

providing on each face, opposite one another, a serrated belt (3,4) comprising a succession of teeth, and adjusting the position of the teeth of at least one of the belts (3,4) to permit both belts (3,4) to mesh, by deforming said belt (3,4) in such a way that both belts (3,4) can mesh, and subsequently stabilizing the mutual position of the belts (3,4) after they are made to mesh, wherein the position of the teeth of at least one of the belts (3,4) is adjusted when at least a part (9) of said shutter (2) is being rolled up simultaneously with the belts (3,4), whereby said part (9) of the shutter (2) comprises a lateral edge of said shutter, and the position of the belts (3,4) is subsequently stabilized in relation to the shutter (2) or in relation to said part (9) of the shutter (2), and wherein the shutter (2), or said part (9) is being rolled up while a belt (3) which is free in relation to the shutter (2), or in relation to said part (9), and which is provided opposite one of the faces of the shutter (2) or of said part (9), is made to mesh with a belt (4) which is fixed in relation to the opposite face of the shutter (2) or of said part (9), whereby this meshing takes place while the shutter (2) or said part (9) is being rolled up, at a place where the two belts (3,4) make contact, after which the free belt (3) is fixed in relation to the shutter (2) or in relation to said part (9), to the face opposite the one with the fixed belt (4) while the belts (3,4) mesh.

2. The method according to claim 1, wherein, in order to make the belts (3,4) mesh, the free belt (3) is stretched in the longitudinal direction while the shutter (2), or said part (9) is being rolled up, in such a way that it is extended as a function of the position of the teeth of the fixed belt (4), and such that both belts (3,4) can mesh.

3. The method according to any of claims 1 and 2, wherein use is made of serrated belts (3,4) whereby the distance between two successive teeth is larger than the width of the teeth in the longitudinal direction of the belts (3,4).

4. The method according to any of claims 1 and 2, further comprising applying an adhesive which sets relatively slowly on the back of the above-mentioned free belt (3) before the latter is rolled up together with the shutter (2) or said part (9) of the shutter (2), such that said belt (3) is fixed to the shutter (2) or to said part (9) in the rolled-up position of the latter after they are made to mesh.

5. The method according to claim 1, wherein the belts (3,4) are provided on each lateral edge of the shutter (2).

6. The method according to claim 1, wherein the lateral edge of the shutter (2) is formed by said part (9) which is made up of a flexible strip (9) to which the above-mentioned belts (3,4) are fixed.

7. The method according to claim 6, wherein a flexible strip is used whereby one of its serrated belts (3,4) forms a whole with it.

8. The method according to any of claims 6 or 7, wherein a flexible strip is used provided with a reinforcement (10) in the longitudinal direction thereof.

9. A method for producing a shutter (2) designed to be rolled up and unrolled, comprising: providing on each face, opposite one another, serrated belts (3,4) comprising a succession of teeth, and adjusting the position of the teeth of at least one of a first belt (3) of the serrated belts (3,4) to permit both belts (3,4) to mesh, by deforming said belt (3) in such a way that both belts (3,4) can mesh, wherein the position of the teeth of at least said first belt (3) is adjusted when at least a part (9) of said shutter (2) is being rolled up simultaneously with the belts (3,4), whereby said part (9) of the shutter (2) comprises a lateral edge of said shutter, and wherein the shutter (2), or said part (9) is being rolled up while said first belt (3) which is free in relation to the shutter (2), or in relation to said part (9), and which is provided opposite one of the faces of the shutter (2) or of said part (9), is made to mesh with a second belt (4) of the serrated belts (3,4) which is fixed in relation to the opposite face of the shutter (2) or of said part (9), whereby this meshing takes place while the shutter (2) or said part (9) is being rolled up, at a place where the two belts (3,4) make contact, after which said first belt (3) is fixed in relation to the shutter (2) or in relation to said part (9), to the face opposite the one with the fixed belt (4) while the belts (3,4) mesh, such that the position of the belts (3,4) is subsequently stabilized in relation to the shutter (2) or in relation to said part (9) of the shutter (2).

10. The method according to claim 9, wherein, in order to make the belts (3,4) mesh, the free belt (3) is stretched in the longitudinal direction while the shutter (2), or said part (9) is being rolled up, in such a way that it is extended as a function of the position of the teeth of the fixed belt (4), and such that both belts (3,4) can mesh.

11. The method according to claim 9, wherein use is made of serrated belts (3,4) whereby the distance between two successive teeth is larger than the width of the teeth in the longitudinal direction of the belts (3,4).

12. The method according to claim 9, further comprising applying an adhesive which sets relatively slowly on the back of the above-mentioned free belt (3) before the latter is rolled up together with the shutter (2) or said part (9) of the shutter (2), such that said belt (3) is fixed to the shutter (2) or to said part (9) in the rolled-up position of the latter.

* * * * *